US012770954B2

(12) United States Patent
Deng et al.

(10) Patent No.: US 12,770,954 B2
(45) Date of Patent: Oct. 20, 2026

(54) COMPOSITE HEATING SYSTEM, AND HEATING METHOD AND HEATING APPARATUS THEREOF

(71) Applicant: JIANGSU ZENERGY BATTERY TECHNOLOGIES GROUP CO., LTD., Jiangsu (CN)

(72) Inventors: Jiangnan Deng, Jiangsu (CN); Bin Jiang, Jiangsu (CN); Chennan Liu, Jiangsu (CN); Wuyuan Zou, Jiangsu (CN)

(73) Assignee: JIANGSU ZENERGY BATTERY TECHNOLOGIES GROUP CO., LTD., Suzhou (CN)

(*) Notice: Subject to any disclaimer, the term of this patent is extended or adjusted under 35 U.S.C. 154(b) by 439 days.

(21) Appl. No.: 18/561,215

(22) PCT Filed: May 18, 2022

(86) PCT No.: PCT/CN2022/093588
§ 371 (c)(1),
(2) Date: Nov. 15, 2023

(87) PCT Pub. No.: WO2022/242686
PCT Pub. Date: Nov. 24, 2022

(65) Prior Publication Data
US 2024/0258601 A1 Aug. 1, 2024

(30) Foreign Application Priority Data
May 18, 2021 (CN) ........................ 202110540082.9

(51) Int. Cl.
*H01M 10/615* (2014.01)
*H01M 10/42* (2006.01)
(Continued)

(52) U.S. Cl.
CPC ....... *H01M 10/615* (2015.04); *H01M 10/425* (2013.01); *H01M 10/443* (2013.01);
(Continued)

(58) Field of Classification Search
CPC ........... H01M 10/615; H01M 10/6556; H01M 10/6567; H01M 10/425; H01M 10/443; H01M 10/482; H01M 10/486
See application file for complete search history.

(56) References Cited

U.S. PATENT DOCUMENTS

| | | | |
|---|---|---|---|
| 2019/0034872 | A1 | 1/2019 | Sullivan |
| 2019/0348724 | A1 | 11/2019 | Satoh |

FOREIGN PATENT DOCUMENTS

| | | | |
|---|---|---|---|
| CN | 103972598 | A | 8/2014 |
| CN | 106898841 | A | 6/2017 |

(Continued)

OTHER PUBLICATIONS

The first office action of counterpart DE application No. 11 2022 002 635.9 issued on Feb. 4, 2025.

*Primary Examiner* — Sarah A. Slifka
(74) *Attorney, Agent, or Firm* — The Sun IP Law

(57) ABSTRACT

Disclosed are a composite heating system, and a heating method and heating apparatus thereof. Two heaters are provided in a heating apparatus of a liquid heating system of the composite heating system. The two heaters are connected to an external power source interface module and a battery pack output power source interface module by a relay group. In the disclosure, by controlling relays in the relay group, during charging preheating, the first heater and the second heater are able to be powered by an external power source and be self-powered by batteries in a battery pack, respectively. When the two heaters are self-powered by batteries in the battery pack, a pulse discharge manner is used, thereby increasing a heating efficiency of the liquid
(Continued)

heating system in a low-temperature environment, and increasing a temperature increasing speed of batteries.

20 Claims, 3 Drawing Sheets

(51) Int. Cl.

| | |
|---|---|
| ***H01M 10/44*** | (2006.01) |
| ***H01M 10/48*** | (2006.01) |
| ***H01M 10/6556*** | (2014.01) |
| ***H01M 10/6567*** | (2014.01) |

(52) U.S. Cl.
CPC ....... *H01M 10/482* (2013.01); *H01M 10/486* (2013.01); *H01M 10/6556* (2015.04); *H01M 10/6567* (2015.04); *H01M 2010/4271* (2013.01)

(56) References Cited

FOREIGN PATENT DOCUMENTS

| | | | |
|---|---|---|---|
| CN | 207781841 | U | 8/2018 |
| CN | 108493517 | A | 9/2018 |
| CN | 109904562 | A | 6/2019 |
| CN | 110137627 | A | 8/2019 |
| CN | 113285144 | A | 8/2021 |
| CN | 216488263 | U | 5/2022 |
| DE | 19803312 | A1 | 8/1999 |
| DE | 19903082 1 | | 8/2000 |
| DE | 102013201296 11 | | 8/2013 |
| JP | 2016068762 | A | 5/2016 |
| JP | 2017228544 | A | 12/2017 |
| JP | 2018037193 | A | 3/2018 |
| KR | 101447425 | B1 | 10/2014 |

COMPOSITE HEATING SYSTEM, AND HEATING METHOD AND HEATING APPARATUS THEREOF

CROSS-REFERENCE TO RELATED APPLICATION

The disclosure is a National Stage Filing of the PCT International Application No: PCT/CN2022/093588 filed on 18 May 2022, which claims priority to and the benefit of Chinese Patent Application No. 202110540082.9, filed to the China National Intellectual Property Administration (CHIPA) on 18 May 2021, which is hereby incorporated by reference in its entirety.

TECHNICAL FIELD

The disclosure relates to the technology field of heating batteries in a battery pack.

BACKGROUND

A lithium ion battery has requirements for an operating temperature, and in particular, when the lithium ion battery is charged, the temperature cannot be too low. When the ambient temperature is too low, charging of the lithium ion battery easily causes crystallization precipitation of an electrolyte in the lithium ion battery. The precipitated crystals can penetrate through a separator, thereby causing a short circuit inside the lithium ion battery, causing risks such as fire explosion. Therefore, when the ambient temperature is too low, it is generally required to heat to raise the temperature of the lithium ion battery until the temperature inside the lithium ion battery reaches an operating temperature range thereof.

In the related art, heating a lithium ion battery in a battery pack usually uses a PTC heating plate for heating or uses a liquid heating manner for heating. Heating by a liquid heating manner is advantageous in that a liquid heating system and a liquid cooling system are combined, and the liquid heating system and the liquid cooling system can share a heat exchange plate without providing an additional heating plate, thereby saving the space inside a battery box of the battery pack. However, compared with the manner in which the PTC heating plate directly heats the lithium ion battery, in the liquid heating manner, a liquid medium needs to be heated first, and then the heated liquid medium is configured to heat the lithium ion battery by the heat exchange plate through a pipeline, such that the battery is heated in the liquid heating manner, but the temperature rising speed of the battery is relatively slow. Therefore, it is necessary to increase the heating efficiency and heating speed of the liquid heating system.

SUMMARY

The problem to be solved by the disclosure is: to increase an efficiency and speed of liquid heating by a liquid heating system of a battery pack.

In order to solve the described problem, the disclosure adopts the technical solution as follows:

Some embodiments of the disclosure provide a composite heating system, including: a liquid heating system, an external power source interface module, a battery pack output power source interface module, a battery acquisition module and a controller; the liquid heating system comprises a heat exchanger and a composite heating apparatus connected to each other by pipelines; the composite heating apparatus includes a first heater and a second heater; the external power source interface module, the battery pack output power source interface module, the first heater and the second heater are connected by a relay group; the relay group includes a plurality of relays; the controller is connected to the liquid heating system, each of the plurality of relays in the relay group, the battery acquisition module and the external power source interface module, and is configured to:

- acquire a voltage data and a temperature data of each of batteries by the battery acquisition module;
- acquire an external power source connection information by the external power source interface module; the external power source connection information is configured to indicate whether the external power source interface module is connected to an external power source;
- determine, when the external power source interface module is connected to the external power source, whether a battery pack temperature is lower than a first temperature threshold according to the temperature data of each of batteries, and instruct connection switching of the plurality of relays in the relay group if the battery pack temperature is lower than the first temperature threshold, such that the external power source is electrically connected to the battery pack output power source interface module by the external power source interface module, to start a charging preheating before batteries are charged; and
- determine, when the external power source interface module is not connected to the external power source, whether the battery pack temperature is lower than a second temperature threshold according to the temperature data of each of batteries, and instruct connection switching of the plurality of relays in the relay group if the battery pack temperature is lower than the second temperature threshold, to start a discharging preheating;
- during the charging preheating, the external power source interface module is at least electrically connected to the first heater; and
- during the discharging preheating, the battery pack output power source interface module is at least electrically connected to the second heater.

In some embodiments, according to the composite heating system of the disclosure, the controller is further configured to:

- determine whether a SOC of a battery pack exceeds a first SOC threshold when starting the charging preheating; and when the SOC of the battery pack exceeds the first SOC threshold, control connection switching of the plurality of relays in the relay group, so that the battery pack output power source interface module is electrically connected to the second heater.

In some embodiments, according to the composite heating system of the disclosure, a pulse discharge controller is connected between the battery pack output power source interface module and the second heater.

Some other embodiments of the disclosure provide a heating method of a composite heating system, the heating method relates to a liquid heating system, an external power source interface module, a battery pack output power source interface module and a battery acquisition module; the liquid heating system includes a heat exchanger and a composite heating apparatus connected to each other by pipelines; the composite heating apparatus includes a first heater and a second heater; the external power source interface module, the battery pack output power source interface module, the first heater and the second heater are connected by a relay group; the relay group includes a plurality of relays; the heating method includes the following steps:

S1: acquiring a voltage data and a temperature data of each of batteries by the battery acquisition module, and acquiring an external power source connection information by the external power source interface module;

the external power source connection information is configured to indicate whether the external power source interface module is connected to an external power source;

S2: determining, when the external power source interface module is connected to the external power source, whether a battery pack temperature is lower than a first temperature threshold according to the temperature data of each of batteries, and instructing connection switching of the plurality of relays in the relay group if the battery pack temperature is lower than the first temperature threshold, such that the external power source is electrically connected to the battery pack output power source interface module by the external power source interface module, to start a charging preheating before batteries are charged; and S3: determining, when the external power source interface module is not connected to the external power source, whether the battery pack temperature is lower than a second temperature threshold according to the temperature data of each of batteries, and instructing connection switching of the plurality of relays in the relay group if the battery pack temperature is lower than the second temperature threshold, to start a discharging preheating;

during the charging preheating, the external power source interface module is at least electrically connected to the first heater; and during the discharging preheating, the battery pack output power source interface module is at least electrically connected to the second heater.

In some embodiments, according to the heating method of a composite heating system of the disclosure, it is determined whether a SOC of a battery pack exceeds a first SOC threshold when starting the charging preheating; and when the SOC of the battery pack exceeds the first SOC threshold, connection switching of the plurality of relays in the relay group is controlled, so that the battery pack output power source interface module is electrically connected to the second heater.

In some embodiments, according to the heating method of a composite heating system of the disclosure, a pulse discharge controller is connected between the battery pack output power source interface module and the second heater.

In some embodiments, according to the heating method of a composite heating system of the disclosure, when starting the charging preheating, and when the SOC of the battery pack exceeds the first SOC threshold, it is determined whether the battery pack temperature is lower than a third temperature threshold; and when the battery pack temperature is lower than the third temperature threshold, connection switching of the plurality of relays in the relay group is controlled, such that the battery pack output power source interface module is electrically connected to the second heater by the pulse discharge controller; otherwise, the battery pack output power source interface module is directly electrically connected to the second heater.

In some embodiments, according to the heating method of a composite heating system of the disclosure, the step S1 further includes: acquiring a charging preheating mode; and the step S2 further includes a step of determining, according to the charging preheating mode, whether to turn on the second heater.

In some embodiments, according to the heating method of a composite heating system of the disclosure, during the charging preheating and the discharging preheating, it is determined whether a liquid medium temperature in the composite heating apparatus exceeds a fourth temperature threshold, and when the liquid medium temperature in the composite heating apparatus exceeds the fourth temperature threshold, a liquid medium circulation of the liquid heating system is started.

In some embodiments, according to the heating method of a composite heating system of the disclosure, during the charging preheating, if the battery pack temperature is increased to a fifth temperature threshold, a battery charging is started by instructing connection switching of the plurality of relays in the relay group; and if the battery pack temperature is increased to a sixth temperature threshold, the charging preheating is stopped.

In some embodiments, according to the heating method of a composite heating system of the disclosure, the step S3 further includes: calculating, according to the battery pack temperature, an electric quantity required for battery heating, and determining whether a difference between a SOC of a battery pack and the electric quantity required for battery heating exceeds a second SOC threshold; and if the difference between the SOC of the battery pack and the electric quantity required for battery heating exceeds a second SOC threshold, starting the discharging preheating.

Still some other embodiments of the disclosure provide a heating apparatus of a composite heating system, the heating apparatus relates to a liquid heating system, an external power source interface module, a battery pack output power source interface module and a battery acquisition module; the liquid heating system includes a heat exchanger and a composite heating apparatus connected to each other by pipelines; the composite heating apparatus includes a first heater and a second heater; the external power source interface module, the battery pack output power source interface module, the first heater and the second heater are connected by a relay group; the relay group includes a plurality of relays; the heating apparatus includes the following modules:

M1, configured to acquire a voltage data and a temperature data of each of batteries by the battery acquisition module, and acquire an external power source connection information by the external power source interface module;

the external power source connection information is configured to indicate whether the external power source interface module is connected to an external power source;

M2, configured to determine, when the external power source interface module is connected to the external power source, whether a battery pack temperature is lower than a first temperature threshold according to the temperature data of each of batteries, and instruct connection switching of the plurality of relays in the relay group if the battery pack temperature is lower than the first temperature threshold, such that the external power source is electrically connected to the battery pack output power source interface module by the external power source interface module, to start a charging preheating before batteries are charged; and M3, configured to determine, when the external power source interface module is not connected to the external power source, whether the battery pack temperature is lower than a second temperature threshold according to the temperature data of each of batteries, and instruct connection switching of the plurality of relays in the relay group if the battery pack temperature is lower than the second temperature threshold, to start a discharging preheating;

during the charging preheating, the external power source interface module is at least electrically connected to the first heater; and during the discharging preheating, the battery pack output power source interface module is at least electrically connected to the second heater.

In some embodiments, according to the heating apparatus of a composite heating system of the disclosure, it is determined whether a SOC of a battery pack exceeds a first SOC threshold when starting the charging preheating; and when the SOC of the battery pack exceeds the first SOC threshold, connection switching of the plurality of relays in the relay group is controlled, so that the battery pack output power source interface module is electrically connected to the second heater.

In some embodiments, according to the heating apparatus of a composite heating system of the disclosure, a pulse discharge controller is connected between the battery pack output power source interface module and the second heater.

In some embodiments, according to the heating apparatus of a composite heating system of the disclosure, when starting the charging preheating, and when the SOC of the battery pack exceeds the first SOC threshold, it is determined whether the battery pack temperature is lower than a third temperature threshold; and when the battery pack temperature is lower than the third temperature threshold, connection switching of the plurality of relays in the relay group is controlled, such that the battery pack output power source interface module is electrically connected to the second heater by the pulse discharge controller; otherwise, the battery pack output power source interface module is directly electrically connected to the second heater.

In some embodiments, according to the heating apparatus of a composite heating system of the disclosure, the module M1 further includes acquiring a charging preheating mode; the module M2 is further configured to: determine, according to the charging preheating mode, whether to turn on the second heater.

In some embodiments, according to the heating apparatus of a composite heating system of the disclosure, during the charging preheating and the discharging preheating, it is determined whether a liquid medium temperature in the composite heating apparatus exceeds a fourth temperature threshold, and when the liquid medium temperature in the composite heating apparatus exceeds the fourth temperature threshold, a liquid medium circulation of the liquid heating system is started.

In some embodiments, according to the heating apparatus of a composite heating system of the disclosure, during the charging preheating, if the battery pack temperature is increased to a fifth temperature threshold, a battery charging is started by instructing connection switching of the plurality of relays in the relay group; and if the battery pack temperature is increased to a sixth temperature threshold, the charging preheating is stopped.

In some embodiments, according to the heating apparatus of a composite heating system of the disclosure, the module M3 further includes: calculating, according to the battery pack temperature, an electric quantity required for battery heating, and determining whether a difference between a SOC of a battery pack and the electric quantity required for battery heating exceeds a second SOC threshold; and if the difference between the SOC of the battery pack and the electric quantity required for battery heating exceeds a second SOC threshold, starting the discharging preheating.

The technical effects of the disclosure are as follows: in the disclosure, two heaters are provided in the liquid heating system, and the two heaters are respectively controlled so as to increase the heating efficiency of the liquid heating system and the temperature increasing speed of batteries.

In which 100 is a battery pack, 1 is an external power source interface module, 200 is a battery array, 2 is a battery pack output power source interface module, 3 is a liquid heating system, 31 is a composite heating apparatus, 31A is a first heating apparatus, 31B is a second heating apparatus, 311 is a first heater, 312 is a second heater, 32 is a heat exchanger, 4 is a relay group, 5 is a pulse discharge controller, 6 is a battery acquisition module, 900 is a controller; K25, K31, K32 and K33 are relays.

DETAILED DESCRIPTION OF THE EMBODIMENTS

Hereinafter, the disclosure will be further described in detail in conjunction with the accompanying drawings.

Figure 1:
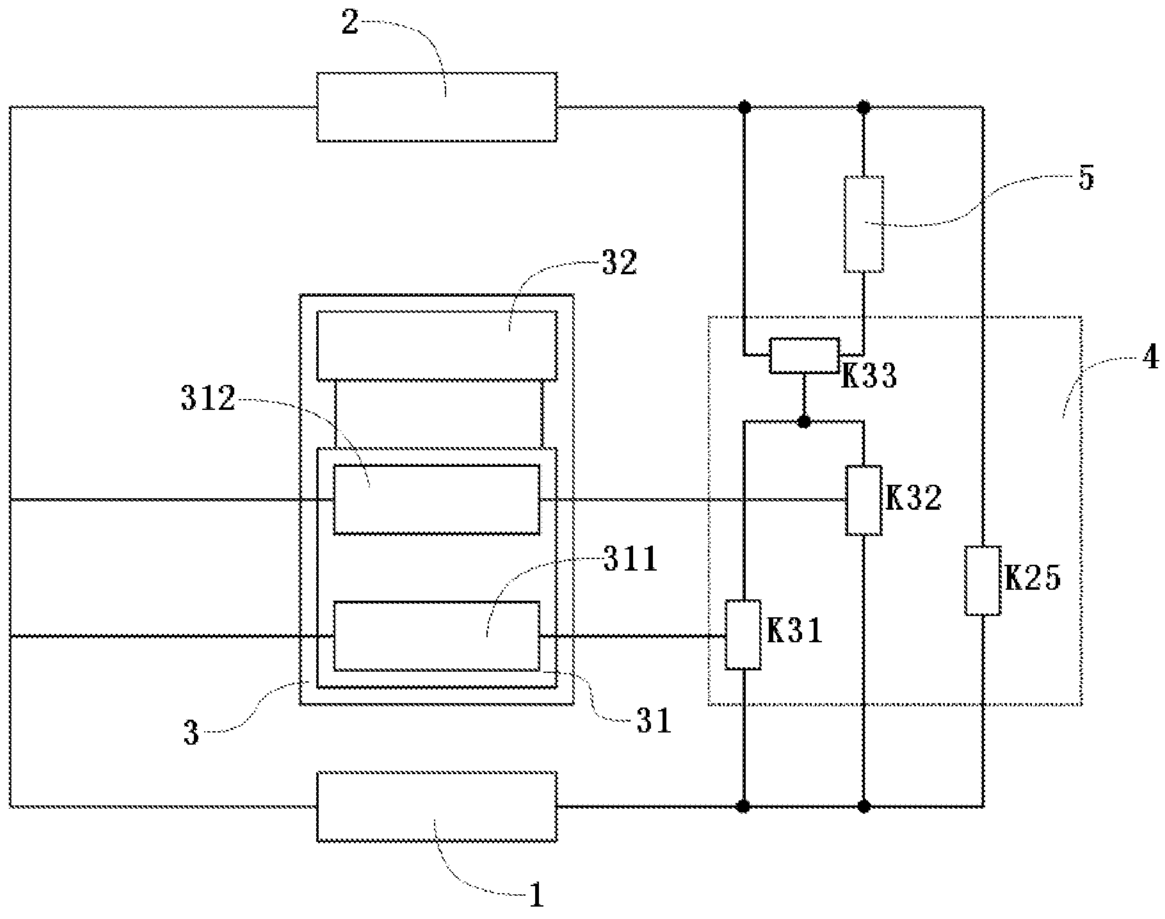
FIG. 1 is a schematic structural diagram of electrical connection of components in an embodiment of a composite heating system of the disclosure.
Figure 2:
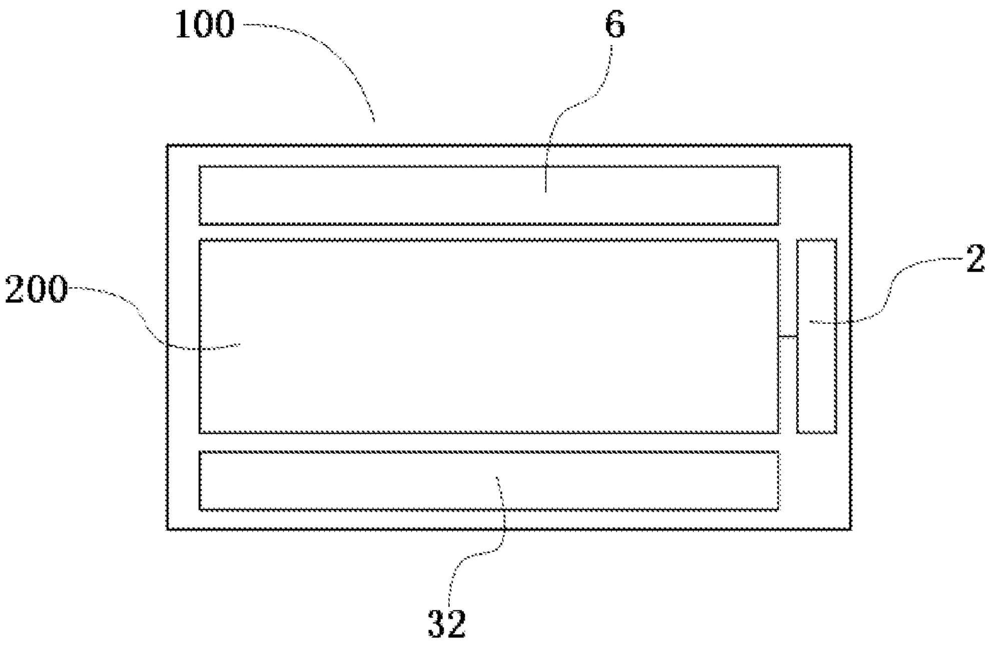
FIG. 2 is a schematic structural diagram of a battery pack according to an embodiment of a composite heating system of the disclosure.
Figure 3:
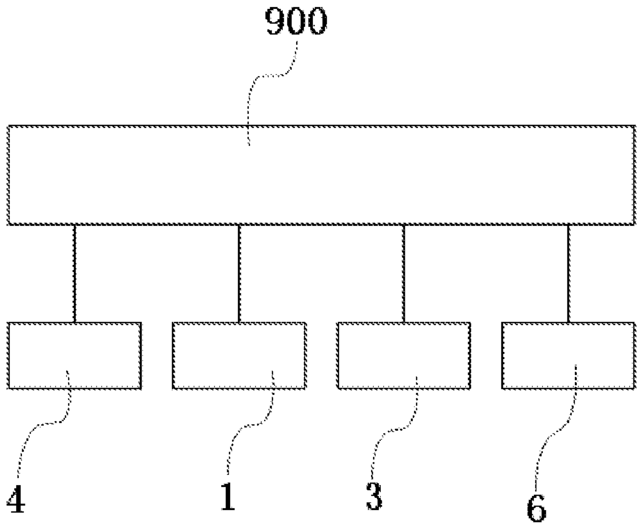
FIG. 3 is a schematic structural diagram of control connection in an embodiment of a composite heating system of the disclosure.

As shown in FIGS. 1, 2 and 3, a composite heating system includes a liquid heating system 3, an external power source interface module 1, a battery pack output power source interface module 2, a pulse discharge controller 5, a battery acquisition module 6 and a controller 900. The liquid heating system 3 includes a heat exchanger 32 and a composite heating apparatus 31 connected to each other by pipelines. The composite heating apparatus 31 includes two heaters, which are respectively a first heater 311 and a second heater 312. The external power source interface module 1, the battery pack output power source interface module 2, the first heater 311 and the second heater 312 are connected by a relay group 4. The battery pack output power source interface module 2 and the heat exchanger 32 are components inside a battery pack, as shown in FIG. 2. FIG. 2 illustrates a battery pack 100. The battery pack 100 includes a battery array 200, the heat exchanger 32, and the battery acquisition module 6 for collecting the voltage and temperature of the battery, which are accommodated in an accommodation cavity. The battery array 200 is formed by connecting a plurality of batteries. The battery array 200 is connected to the battery pack output power source interface module 2. The external power source interface module 1 is configured to be electrically connected to the battery pack output power source interface module 2, and then to charge batteries in the battery pack.

The heat exchanger 32 and the composite heating apparatus 31 are internally provided with a liquid medium for heat exchange and capable of flowing in a circulating manner. The liquid medium is heated by the first heater 311 and/or the second heater 312 in the composite heating apparatus 31, then is conveyed to the heat exchanger 32 by the pipelines under the driving of a circulation pump, and then heats batteries in the battery pack in the heat exchanger 32 by heat exchange.

The relay group 4 includes a plurality of relays. By connection switching of the plurality of relays in the relay group 4, the external power source interface module 1 is able to be at least electrically connected to the first heater 311, the battery pack output power source interface module 2 is able to be at least electrically connected to the second heater 312, and the external power source interface module 1 is able to be electrically connected to the battery pack output power source interface module 2. When the external power source interface module 1 is electrically connected to the battery pack output power source interface module 2, an external power source connected to the external power source interface module 1 charges batteries in the battery pack; when the external power source interface module 1 is electrically connected to the first heater 311, the first heater 311 uses the external power source as a power supply for heating; and when the battery pack output power source interface module 2 is electrically connected to the second heater 312, the second heater 312 uses batteries in the battery pack as a power supply for heating.

Specifically, in the embodiment, the relay group 4 includes relays K31, K32, K33 and K25. The relays K31 and K32 are three-way relays. The relay K31 is connected to the external power source interface module 1, the battery pack output power source interface module 2 and the first heater 311; and the relay K32 is connected to the external power source interface module 1, the battery pack output power source interface module 2 and the second heater 312. The relay K25 is connected between the external power source interface module 1 and the battery pack output power source interface module 2. The relays K31 and K32 being three-way relays means that the relays K31 and K32 both have three connection states: a first connection state is switching a connected heater to connect to the external power source interface module 1; a second connection state is switching a connected heater to connect to the battery pack output power source interface module 2; and a third connection state is switching a connected heater to connect to empty. When K31 is in the first connection state, the electrical connection between K31 and the battery pack output power source interface module 2 is cut off, and when K32 is in the first connection state, the electrical connection between K32 and the battery pack output power source interface module 2 is cut off; When K31 is in the second connection state, the electrical connection between K31 and the external power source interface module 1 is cut off, and when K32 is in the second connection state, the electrical connection between K32 and the external power source interface module 1 is cut off; and when K31 is in the third connection state, the electrical connection between K31 and both the external power source interface module 1 and the battery pack output power source interface module 2 is cut off, and when K32 is in the third connection state, the electrical connection between K32 and both the external power source interface module 1 and the battery pack output power source interface module 2 is cut off. When the relays K31 and K32 are both in the second connection state and the relay K25 is disconnected, the battery pack output power source interface module 2 is electrically connected to both the first heater 311 and the second heater 312, and thus the first heater 311 and the second heater 312 both use batteries in the battery pack as a power supply for heating the liquid medium in the composite heating apparatus 31; when the relays K31 and K32 are both in the first connection state and the relay K25 is disconnected, the external power source interface module 1 is electrically connected to both the first heater 311 and the second heater 312, and thus the first heater 311 and the second heater 312 both use the external power source as a power supply for heating the liquid medium in the composite heating apparatus 31; and when the relay K31 is in the first connection state, the relay K32 is in the second connection state and the relay K25 is disconnected, the first heater 311 and the second heater 312 are respectively electrically connected to the external power source interface module 1 and the battery pack output power source interface module 2, and thus the first heater 311 and the second heater 312 respectively use the external power source as a power supply and batteries in the battery pack as a power supply, for heating. In the three cases above, the electrical connection between the external power source interface module 1 and the battery pack output power source interface module 2 is cut off.

The relay K33 is either a two-way relay or a three-way relay. The relay K33 at least has two states: a first state is that the relay is directly connected to the battery pack output power source interface module 2; and a second state is that the relay is connected to the battery pack output power source interface module 2 by the pulse discharge controller 5. When the relay K33 is switched to the first state, the first heater 311 and the second heater 312 are respectively connected to the battery pack output power source interface module 2 by the relays K31 and K32; and when the relay K33 is switched to the second state, the first heater 311 and the second heater 312 are respectively connected to the battery pack output power source interface module 2 through the pulse discharge controller 5 by the relays K31 and K32. The pulse discharge controller 5 is configured to discharge, in a pulse discharge manner, the batteries connected to the battery pack output power source interface module 2. The principle of pulse discharge of batteries is based on a discharge policy that a lithium ion battery is not suitable for continuous discharge when the temperature is too low. For technical data in this aspect, reference can be made to document materials such as CN108777339A.

With reference to FIG. 3, the controller 900 is connected to the liquid heating system 3, each of the plurality of relays in the relay group 4, the battery acquisition module 6 and the external power source interface module 1. The controller 900 is a circuit module implemented by a processor and a memory, and in a battery pack system, the controller 900 is generally referred to as a battery management system. The controller 900 controls each of the plurality of relays of the relay group 4 by executing a software program, thereby controlling the heating of the composite heating system. Heating control of the composite heating system implemented by the controller 900 by executing the software program is a heating method of the composite heating system referred to in the disclosure. A heating apparatus of the composite heating system referred to in the disclosure is an virtual apparatus corresponding to the heating method of the composite heating system. The heating method of the composite heating system according to the disclosure includes: a data acquisition step, a heating control step during charging, and a heating control step during discharging.

The data acquisition step, i.e. step S1 as stated above, is configured for acquiring a voltage data and a temperature data of each of batteries by the battery acquisition module 6, and acquiring an external power source connection information by the external power source interface module 1. The external power source connection information is configured to indicate whether the external power source interface module 1 is connected to an external power source.

The heating control step during charging, i.e. step S2 as stated above, is configured for determining, when the external power source interface module 1 is connected to the external power source, whether a battery pack temperature is lower than a first temperature threshold according to the temperature data of each of batteries, and instructing connection switching of the plurality of relays in the relay group 4 if the battery pack temperature is lower than the first temperature threshold, such that the external power source is electrically connected to the battery pack output power source interface module 2 by the external power source interface module 1, to start a charging preheating before batteries are charged. During the charging preheating, the external power source interface module 1 is at least electrically connected to the first heater 311. Here, "at least" means that during charging preheating, the external power source interface module 1 is also able to be electrically connected to the second heater 312. Here, the first temperature threshold is a preset value. The battery pack temperature is able to be obtained by averaging the temperature of each of batteries.

In the embodiment, during the charging preheating, the second heater 312 is electrically connected to the battery pack output power source interface module 2. That is, in the embodiment, during the charging preheating, the first heater 311 is electrically connected to the external power source interface module 1 and is powered by the external power source, and the second heater 312 is electrically connected to the battery pack output power source interface module 2 and is self-powered by batteries in the battery pack.

When batteries in the battery pack supply power to the second heater 312 during the charging preheating, the battery pack output power source interface module 2 is also able to be electrically connected to the second heater 312 by the pulse discharge controller 5, thereby achieving pulse discharge of batteries at a low temperature. Whether the battery pack output power source interface module 2 is electrically connected to the second heater 312 by the pulse discharge controller 5 is completed by the controller 900 instructing the switching of the relay K33.

In the embodiment, the charging preheating also has a charging preheating mode parameter. A charging preheating mode is inputted from a user. That is to say, step S1 further includes: acquiring a charging preheating mode. Thus, in step S2, it is determined, according to the charging preheating mode, whether to turn on the second heater 312. In addition, those skilled in the art would understand that when batteries in the battery pack supply power to the second heater 312, an electric quantity of batteries in the battery pack should also be taken into consideration, i.e. determining whether a state of charge (SOC) of the battery pack exceeds a first SOC threshold. The first SOC threshold herein is a preset value.

Further, in the embodiment, the controller 900 performing the heating control step during charging is driven by an interruption manner. That is, when the external power source interface module 1 is connected to the external power source, the external power source interface module 1 sends a corresponding interrupt signal to the controller 900, so that the controller 900 executes a heating control step during charging. At this time, the controller 900 receives the corresponding interrupt signal sent by the external power source interface module 1, which is equivalent to a determination that "when the external power source interface module 1 is connected to the external power source". In the embodiment, the specific processing steps of the heating control step during charging are as follows:

S21: verifying whether the external power source interface module 1 is connected to the external power source; if the external power source interface module 1 is not connected to the external power source, indicating that the current interrupt signal is an anomalous interrupt signal, and then returning; otherwise, proceeding to step S22;

S22: averaging the temperature value of each of batteries as the battery pack temperature; determining whether the battery pack temperature is lower than a first temperature threshold; if the battery pack temperature is higher than the first temperature threshold, directly starting charging and then returning; otherwise, proceeding to step S23;

S23: if the charging preheating mode is a first charging preheating mode, starting the first heater 311 and the second heater 312 to be powered by the external power source to start heating, and entering the charging preheating; and if the charging preheating mode is a second charging preheating mode, starting the first heater 311 to be powered by the external power source to start heating, and entering the charging preheating; otherwise, proceeding to step S24;

S24: determining whether the SOC of the battery pack exceeds a first SOC threshold; if the SOC of the battery pack does not exceed the first SOC threshold, starting the first heater 311 to be powered by the external power source to start heating, and entering the charging preheating; otherwise, proceeding to step S25;

specifically, the first SOC threshold refers to an electric quantity that is just able to allow for heating the battery pack temperature to a fifth temperature threshold;

S25: determining whether the battery pack temperature is lower than a third temperature threshold; if the battery pack temperature is lower than the third temperature threshold, starting the first heater 311 to be powered by the external power source to start heating, starting the second heater 312 to be powered by batteries in the battery pack in a pulse discharge manner to start heating, and entering the charging preheating; otherwise, starting the first heater 311 to be powered by the external power source to start heating, starting the second heater 312 to be directly powered by the battery pack to start heating, and entering the charging preheating;

specifically, the third temperature threshold is less than the first temperature threshold; the third temperature threshold is in a low temperature range, and using pulse discharge of batteries in the battery pack for supplying power is able to achieve continuous discharging of the lithium ion battery when the temperature is too low; and S26: continuously monitoring the battery pack temperature during the charging preheating; if the battery pack temperature is increased to the fifth temperature threshold, starting battery charging by instructing connection switching of the plurality of relays in the relay group; and if the battery pack temperature is increased to a sixth temperature threshold, stopping the charging preheating.

Specifically, the fifth temperature threshold is greater than the third temperature threshold, and the fifth temperature threshold is less than or equal to the first temperature threshold.

In step S23, the first heater 311 and the second heater 312 are started to be powered by the external power source to start heating, that is, by controlling the plurality of relays in the relay group 4, the first heater 311 and the second heater 312 are electrically connected to the external power source interface module 1. Step S23 means that there are two charging preheating modes in the embodiment.

In step S23 and step S24, the first heater 311 is started to be powered by the external power source to start heating, that is, by controlling the plurality of relays in the relay group 4, the first heater 311 is electrically connected to the external power source interface module 1, and at this time, the second heater 312 does not operate.

In step S25, the first heater 311 is started to be powered by the external power source to start heating, and the second heater 312 is started to be powered by batteries in the battery pack in a pulse discharge manner to start heating, that is, by controlling the plurality of relays in the relay group 4, the first heater 311 is electrically connected to the external power source interface module 1, and the battery pack output power source interface module 2 is electrically connected to the second heater 312 by the pulse discharge controller 5. The second heater 312 is started to be directly powered by the battery pack to start heating, that is, the battery pack output power source interface module 2 is directly electrically connected to the second heater 312 without passing through the pulse discharge controller 5.

It should be noted that "starting the charging preheating" and "entering the charging preheating" indicate the time when the charging preheating is started. However, "charging preheating" is a relatively long process. Therefore, there is step S26 of "continuously monitoring the battery pack temperature during the charging preheating". In step S26, battery charging is started, specifically to the embodiment, that is, the relay K25 is closed, so that the external power source interface module 1 is electrically connected to the battery pack output power source interface module 2. This also means that charging is not started when the charging preheating starts, specifically to the embodiment, that is, the relay K25 is disconnected at the beginning. Only when the battery pack temperature is increased to the fifth temperature threshold, is the relay K25 closed, thereby starting the battery charging process.

In step S26, the fifth temperature threshold and the sixth temperature threshold are preset values. The fifth temperature threshold and the sixth temperature threshold are the same or different. Obviously, if the sixth temperature threshold is greater than the fifth temperature threshold, in the charging preheating process, there is a process in which heating and charging simultaneously occur. In this case, in the embodiment, when the battery pack temperature is increased to the fifth temperature threshold, the second charging preheating mode is entered in a forcible manner. In the second charging preheating mode, the first heater 311 is started to be powered by the external power source for heating, and the second heater 312 is stopped from being powered. If the fifth temperature threshold and the sixth temperature threshold are the same, it means that the charging preheating is stopped while the battery charging is started.

The heating control step during discharging, i.e. step S3 as stated above, is configured for determining, when the external power source interface module 1 is not connected to the external power source, whether the battery pack temperature is lower than a second temperature threshold according to the temperature data of each of batteries, and instructing connection switching of the plurality of relays in the relay group 4 if the battery pack temperature is lower than the second temperature threshold, to start a discharging preheating. During the discharging preheating, the battery pack output power source interface module 2 is at least electrically connected to the second heater 312. Here, "at least" indicates that during the discharging preheating, the battery pack output power source interface module 2 is also able to be electrically connected to the first heater 311. The second temperature threshold herein is a preset value, and is the same as or different from the first temperature threshold above.

The heating control step during discharging is a heating control step before the battery pack needs to be discharged. Specifically, in the embodiment, the battery pack is provided in an electric vehicle. When functional components of the electric vehicle need to be started, e.g., when an engine is to be started, the controller 900 will receive a signal requiring battery pack discharge. Upon receiving the signal requiring battery pack discharge, the heating control step during discharging is entered. The heating control step during discharging, specifically to the embodiment, includes the following steps:

S31: verifying whether the external power source interface module 1 is connected to the external power source; if the external power source interface module 1 is connected to the external power source, indicating that the battery pack is in a non-dischargeable state, and then returning; otherwise, proceeding to step S32;

S32: averaging the temperature value of each of batteries as the battery pack temperature; determining whether the battery pack temperature is lower than the second temperature threshold; if the battery pack temperature is higher than the second temperature threshold, directly starting discharging and then returning; otherwise, proceeding to step S33;

S33: calculating, according to the battery pack temperature, an electric quantity required for battery heating, and determining whether a difference between a SOC of the battery pack and the electric quantity required for battery heating exceeds a second SOC threshold; if the difference between the SOC of the battery pack and the electric quantity required for battery heating exceeds the second SOC threshold, proceeding to step S34; otherwise, discharging failing and returning;

specifically, the second SOC threshold means an electric quantity that is just able to allow for heating the battery pack temperature to an eighth temperature threshold;

S34: determining whether the battery pack temperature is lower than a seventh temperature threshold; if the battery pack temperature is lower than the seventh temperature threshold, starting the heater to be powered by batteries in the battery pack in a pulse discharge manner to start heating, and entering the discharging preheating; otherwise, starting the heater to be directly powered by the battery pack to start heating, and entering the discharging preheating;

S35: continuously monitoring the battery pack temperature during the discharging preheating; if the battery pack temperature is increased to the eighth temperature threshold, starting battery charging and stopping the discharging preheating by instructing connection switching of the plurality of relays in the relay group.

In the steps above, the second temperature threshold, the seventh temperature threshold, and the eighth temperature threshold are all preset values.

In step S34, the heater in "starting the heater to be powered by the batteries in the battery pack in a pulse discharge manner to start heating," and "starting the heater to be directly powered by the battery pack to start heating" is the second heater 312, and is also the first heater 311 and the second heater 312. Whether the "heater" is the second heater 312 or the first heater 311 and the second heater 312 is determined by a discharging preheating mode. The discharging preheating mode is inputted from a user. That is to say, step S1 further includes: acquiring a discharging preheating mode. Thus, in step S34, if the discharging preheating mode is a first discharging preheating mode, the "heater" is the second heater 312; that is, when the composite heating apparatus is for heating, the second heater 312 operates individually, and the first heater 311 does not operate; and if the discharging preheating mode is a second discharging preheating mode, the "heater" is the first heater 311 and the second heater 312; that is, when the composite heating apparatus is for heating, the first heater 311 and the second heater 312 are for heating together.

In addition, "starting the discharging preheating" and "entering the discharging preheating" indicate the time when the discharging preheating is started. However, "discharging preheating" is a relatively long process. Therefore, there is step S35 of "continuously monitoring the battery pack temperature during the discharging preheating".

In addition, in the embodiment, the first heater 311 and the second heater 312 are components inside the composite heating apparatus 31 of the liquid heating system 3. The first heater 311 and the second heater 312 heat the liquid medium in the composite heating apparatus 31, not the batteries themselves. The composite heating apparatus 31 is separated from the batteries by the pipelines and the heat exchanger 32. When the charging preheating and the discharging preheating initially start, a liquid medium temperature in the liquid heating system 3 is still in a low temperature state, and therefore it is not necessary to immediately start a liquid medium circulation in the liquid heating system 3. Therefore, it is considered that when the liquid medium temperature in the composite heating apparatus 31 is heated to a certain degree, the liquid medium circulation is started. That is, steps S26 and S35 further include the following steps:

measuring the liquid medium temperature in the composite heating apparatus 31, determining whether the liquid medium temperature in the composite heating apparatus 31 exceeds a fourth temperature threshold, and if the liquid medium temperature in the composite heating apparatus 31 exceeds the fourth temperature threshold, starting the liquid medium circulation of the liquid heating system 3.

Starting the liquid medium circulation of the liquid heating system 3 is that a control valve between the composite heating apparatus 31 and the heat exchanger 32 is opened, and a circulation pump is opened to pump the heated liquid medium in the composite heating apparatus 31 into the heat exchanger 32 by pipelines for heat exchange with batteries, and the liquid medium after heat exchange is returned to the composite heating apparatus 31 by the pipelines. Although the drawings of the disclosure do not illustrate the control valve and the circulation pump, they do not hinder the understanding of those skilled in the art.

Obviously, when the composite heating apparatus 31 is started for heating, the liquid medium circulation is also directly started.

In addition, it should be noted that the first heater 311 and the second heater 312 are two heaters of the same type, or two heaters of different types. There are various types of heaters, such as a quartz heating tube, a microwave heater, and a magnetic induction heater. In the embodiment, the first heater 311 and the second heater 312 are two heaters of different types, and the two heaters of different types are the microwave heater and the magnetic induction heater. That is, the first heater 311 and the second heater 312 are the microwave heater and the magnetic induction heater, respectively, or the first heater 311 and the second heater 312 are the magnetic induction heater and the microwave heater, respectively.

Figure 4:
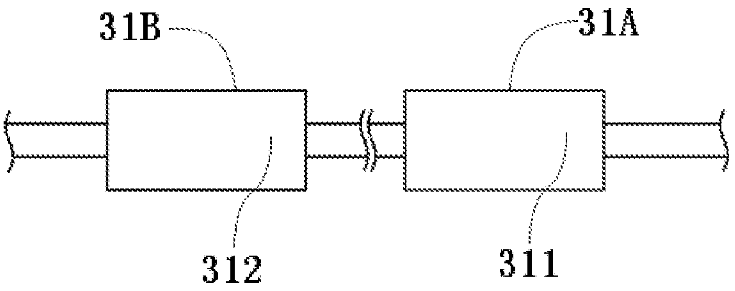
FIG. 4 is a schematic structural diagram of a composite heating apparatus composed of two separate heating apparatuses.

In addition, it should also be pointed out that the composite heating apparatus in the embodiment is also composed of two heating apparatuses connected by pipelines, referring to FIG. 4. The composite heating apparatus in the example shown in FIG. 4 includes two heating apparatuses connected by pipelines, which are respectively a first heating apparatus 31A and a second heating apparatus 31B. The first heating apparatus 31A and the second heating apparatus 31B are two heating apparatuses that are spatially far apart. The first heating apparatus 31A is internally provided with the first heater 311, and the second heating apparatus 31B is internally provided with the second heater 312.

What is claimed is:

1. A composite heating system, comprising: a liquid heating system, an external power source interface module, a battery pack output power source interface module, a battery acquisition module, and a controller; the liquid heating system comprises a heat exchanger and a composite heating apparatus connected to each other by pipelines; the composite heating apparatus comprises a first heater and a second heater; the external power source interface module, the battery pack output power source interface module, the first heater and the second heater are connected by a relay group; the relay group comprises a plurality of relays; the controller is connected to the liquid heating system, each of the plurality of relays in the relay group, the battery acquisition module and the external power source interface module, and is configured to:

acquire a voltage data and a temperature data of each of batteries by the battery acquisition module;

acquire an external power source connection information by the external power source interface module; the external power source connection information is configured to indicate whether the external power source interface module is connected to an external power source;

determine, when the external power source interface module is connected to the external power source, whether a battery pack temperature is lower than a first temperature threshold according to the temperature data of each of batteries, and instruct connection switching of the plurality of relays in the relay group if the battery pack temperature is lower than the first temperature threshold, such that the external power source is electrically connected to the battery pack output power source interface module by the external power source interface module, to start a charging preheating before batteries are charged; and determine, when the external power source interface module is not connected to the external power source, whether the battery pack temperature is lower than a second temperature threshold according to the temperature data of each of batteries, and instruct connection switching of the plurality of relays in the relay group if the battery pack temperature is lower than the second temperature threshold, to start a discharging preheating;

during the charging preheating, the external power source interface module is at least electrically connected to the first heater; and during the discharging preheating, the battery pack output power source interface module is at least electrically connected to the second heater.

2. The composite heating system according to claim 1, wherein the controller is further configured to:

determine whether a SOC of a battery pack exceeds a first SOC threshold when starting the charging preheating; and when the SOC of the battery pack exceeds the first SOC threshold, control connection switching of the plurality of relays in the relay group, so that the battery pack output power source interface module is electrically connected to the second heater.

3. The composite heating system according to claim 2, wherein a pulse discharge controller is connected between the battery pack output power source interface module and the second heater.

4. A heating method of a composite heating system, the heating method relates to a liquid heating system, an external power source interface module, a battery pack output power source interface module and a battery acquisition module; the liquid heating system comprises a heat exchanger and a composite heating apparatus connected to each other by pipelines; the composite heating apparatus comprises a first heater and a second heater; the external power source interface module, the battery pack output power source interface module, the first heater and the second heater are connected by a relay group; the relay group comprises a plurality of relays; the heating method comprises the following steps:

S1: acquiring a voltage data and a temperature data of each of batteries by the battery acquisition module, and acquiring an external power source connection information by the external power source interface module;

the external power source connection information is configured to indicate whether the external power source interface module is connected to an external power source;

S2: determining, when the external power source interface module is connected to the external power source, whether a battery pack temperature is lower than a first temperature threshold according to the temperature data of each of batteries, and instructing connection switching of the plurality of relays in the relay group if the battery pack temperature is lower than the first temperature threshold, such that the external power source is electrically connected to the battery pack output power source interface module by the external power source interface module, to start a charging preheating before batteries are charged; and S3: determining, when the external power source interface module is not connected to the external power source, whether the battery pack temperature is lower than a second temperature threshold according to the temperature data of each of batteries, and instructing connection switching of the plurality of relays in the relay group if the battery pack temperature is lower than the second temperature threshold, to start a discharging preheating;

during the charging preheating, the external power source interface module is at least electrically connected to the first heater; and during the discharging preheating, the battery pack output power source interface module is at least electrically connected to the second heater.

5. The heating method of a composite heating system according to claim 4, wherein it is determined whether a SOC of a battery pack exceeds a first SOC threshold when starting the charging preheating; and when the SOC of the battery pack exceeds the first SOC threshold, connection switching of the plurality of relays in the relay group is controlled, so that the battery pack output power source interface module is electrically connected to the second heater.

6. The heating method of a composite heating system according to claim 5, wherein a pulse discharge controller is connected between the battery pack output power source interface module and the second heater.

7. The heating method of a composite heating system according to claim 6, wherein when starting the charging preheating, and when the SOC of the battery pack exceeds the first SOC threshold, it is determined whether the battery pack temperature is lower than a third temperature threshold; and when the battery pack temperature is lower than the third temperature threshold, connection switching of the plurality of relays in the relay group is controlled, such that the battery pack output power source interface module is electrically connected to the second heater by the pulse discharge controller; otherwise, the battery pack output power source interface module is directly electrically connected to the second heater.

8. The heating method of a composite heating system according to claim 5, wherein the step S1 further comprises: acquiring a charging preheating mode; and the step S2 further comprises a step of determining, according to the charging preheating mode, whether to turn on the second heater.

9. The heating method of a composite heating system according to claim 4, wherein during the charging preheating and the discharging preheating, it is determined whether a liquid medium temperature in the composite heating apparatus exceeds a fourth temperature threshold, and when the liquid medium temperature in the composite heating apparatus exceeds the fourth temperature threshold, a liquid medium circulation of the liquid heating system is started.

10. The heating method of a composite heating system according to claim 4, wherein during the charging preheating, if the battery pack temperature is increased to a fifth temperature threshold, a battery charging is started by instructing connection switching of the plurality of relays in the relay group; and if the battery pack temperature is increased to a sixth temperature threshold, the charging preheating is stopped.

11. The heating method of a composite heating system according to claim 4, wherein the step S3 further comprises:

calculating, according to the battery pack temperature, an electric quantity required for battery heating, and determining whether a difference between a SOC of a battery pack and the electric quantity required for battery heating exceeds a second SOC threshold; and if the difference between the SOC of the battery pack and the electric quantity required for battery heating exceeds a second SOC threshold, starting the discharging preheating.

12. The heating method of a composite heating system according to claim 11, wherein the step S1 further comprises: acquiring a discharging preheating mode; and the step S3 further comprises a step of determining, according to the discharging preheating mode, whether to turn on the first heater.

13. A heating apparatus of a composite heating system, the heating apparatus relates to a liquid heating system, an external power source interface module, a battery pack output power source interface module and a battery acquisition module; the liquid heating system comprises a heat exchanger and a composite heating apparatus connected to each other by pipelines; the composite heating apparatus comprises a first heater and a second heater; the external power source interface module, the battery pack output power source interface module, the first heater and the second heater are connected by a relay group; the relay group comprises a plurality of relays; the heating apparatus comprises the following modules:

M1, configured to acquire a voltage data and temperature data of each of batteries by the battery acquisition module, and acquire an external power source connection information by the external power source interface module;

the external power source connection information is configured to indicate whether the external power source interface module is connected to an external power source;

M2, configured to determine, when the external power source interface module is connected to the external power source, whether a battery pack temperature is lower than a first temperature threshold according to the temperature data of each of batteries, and instruct connection switching of the plurality of relays in the relay group if the battery pack temperature is lower than the first temperature threshold, such that the external power source is electrically connected to the battery pack output power source interface module by the external power source interface module, to start a charging preheating before batteries are charged; and M3, configured to determine, when the external power source interface module is not connected to the external power source, whether the battery pack temperature is lower than a second temperature threshold according to the temperature data of each of batteries, and instruct connection switching of the plurality of relays in the relay group if the battery pack temperature is lower than the second temperature threshold, to start a discharging preheating;

during the charging preheating, the external power source interface module is at least electrically connected to the first heater; and during the discharging preheating, the battery pack output power source interface module is at least electrically connected to the second heater.

14. The heating apparatus of a composite heating system according to claim 13, wherein it is determined whether a SOC of a battery pack exceeds a first SOC threshold when starting the charging preheating; and when the SOC of the battery pack exceeds the first SOC threshold, connection switching of the plurality of relays in the relay group is controlled, so that the battery pack output power source interface module is electrically connected to the second heater.

15. The heating apparatus of a composite heating system according to claim 14, wherein a pulse discharge controller is connected between the battery pack output power source interface module and the second heater.

16. The heating apparatus of a composite heating system according to claim 15, wherein when starting the charging preheating, and when the SOC of the battery pack exceeds the first SOC threshold, it is determined whether the battery pack temperature is lower than a third temperature threshold; and when the battery pack temperature is lower than the third temperature threshold, connection switching of the plurality of relays in the relay group is controlled, such that the battery pack output power source interface module is electrically connected to the second heater by the pulse discharge controller; otherwise, the battery pack output power source interface module is directly electrically connected to the second heater.

17. The heating apparatus of a composite heating system according to claim 13, wherein the module M1 further comprises acquiring a charging preheating mode;

the module M2 is further configured to: determine, according to the charging preheating mode, whether to turn on the second heater.

18. The heating apparatus of a composite heating system according to claim 13, wherein the module M3 further comprises: calculating, according to the battery pack temperature, an electric quantity required for battery heating, and determining whether a difference between a SOC of a battery pack and the electric quantity required for battery heating exceeds a second SOC threshold; and if the difference between the SOC of the battery pack and the electric quantity required for battery heating exceeds a second SOC threshold, starting the discharging preheating.

19. The heating apparatus of a composite heating system according to claim 13, wherein during the charging preheating and the discharging preheating, it is determined whether a liquid medium temperature in the composite heating apparatus exceeds a fourth temperature threshold, and when the liquid medium temperature in the composite heating apparatus exceeds the fourth temperature threshold, a liquid medium circulation of the liquid heating system is started.

20. The heating apparatus of a composite heating system according to claim 13, wherein during the charging preheating, if the battery pack temperature is increased to a fifth temperature threshold, a battery charging is started by instructing connection switching of the plurality of relays in the relay group; and if the battery pack temperature is increased to a sixth temperature threshold, the charging preheating is stopped.

* * * * *